United States Patent
Pålsson et al.

[19]

[11] Patent Number: 5,917,718
[45] Date of Patent: Jun. 29, 1999

[54] METHOD AND APPARATUS FOR ELIMINATING OVERMODULATION IN A POWER PLANT

[75] Inventors: Rolf Pålsson, Saxdalen; Kjell Svensson, Ludvika, both of Sweden

[73] Assignee: Asea Brown Boveri AB, Vasteras, Sweden

[21] Appl. No.: 08/950,763

[22] Filed: Oct. 15, 1997

[30] Foreign Application Priority Data

Mar. 24, 1997 [SE] Sweden .................................. 9701061

[51] Int. Cl.⁶ .......................................................... H02J 3/36
[52] U.S. Cl. ................................................. 363/35; 363/41
[58] Field of Search ................................ 363/35, 37, 34, 363/65, 41

[56] References Cited

U.S. PATENT DOCUMENTS

| | | | |
|---|---|---|---|
| 4,648,018 | 3/1987 | Neupauer | 363/35 |
| 4,903,184 | 2/1990 | Hirose | 363/37 |
| 4,941,079 | 7/1990 | Ooi | 363/132 |
| 5,051,683 | 9/1991 | Hirose et al. | 323/207 |
| 5,535,113 | 7/1996 | Konishi | 363/35 |

FOREIGN PATENT DOCUMENTS 7-213067  8/1995  Japan .

OTHER PUBLICATIONS

Lindberg, PWM and Control of Two and Three Level High Power Voltage Source Converters, 1995, ISSN–1100–1615, TRITA–EHE 9501 (Stockholm), See ch. 5.3.1, ch. 5.3.3, first page.

*Primary Examiner*—Shawn Riley
*Attorney, Agent, or Firm*—Pollock, Vande Sande & Amernick

[57] ABSTRACT

A method and apparatus for eliminating overmodulation in a power plant is provided. The power plant has a direct voltage network connected to at least one alternating voltage network through a station. The station is adapted to transmit power between the direct voltage network and the alternating voltage network and includes at least one converter. The converter is adapted to convert direct voltage into alternating voltage and convert alternating voltage into direct voltage. The method comprises the steps of calculating a reference alternating voltage and measuring a direct voltage between two poles of a direct voltage side of the station. The reference voltage is divided by half of the direct voltage and this quotient is compared with a predetermined value. When the quotient exceeds the predetermined value, a first signal is sent to a means for controlling the converter. In response to receiving the first signal, the converter is controlled to increase consumption of reactive power on the alternating voltage side of the station.

16 Claims, 2 Drawing Sheets

METHOD AND APPARATUS FOR ELIMINATING OVERMODULATION IN A POWER PLANT

BACKGROUND OF THE INVENTION

The present invention relates to a plant for transmitting electric power comprising a direct voltage network and at least one alternating voltage network connected thereto through a station. The station is adapted to perform transmission of electric power between the direct voltage network and the alternating voltage network and comprises at least one VSC converter adapted to convert direct voltage into alternating voltage and the converse, and an apparatus for controlling the converter. The plant further includes means adapted to calculate a pulse width modulation pattern, according to which the apparatus controls the converter for alternating voltage generation based upon a reference alternating voltage calculated through orders of reactive and active power flow given to the converter and the magnitude of the direct voltage of the direct voltage network at the station.

Such a plant has recently become known through the thesis "PWM and Control of Two and Three Level High Power Voltage Source Converters" by Anders Lindberg, Kungliga Tekniska Högskolan, Stockholm, 1995, in which publication such a plant for transmitting electric power through a direct voltage network for High Voltage Direct Current (HVDC) is described.

Before the issuance of the above thesis, plants for transmitting electric power through a direct voltage network for High Voltage Direct Current were based upon the use of line-commutated converters with thyristors or mercury-arc valves and CSC (Current Source Converter) converters. The development of IGBTs (Insulated Gate Bipolar Transistor, bipolar transistor having an insulated gate) for high voltage applications, and the suitability of connecting them in series in valves in converters, since they may easily be turned on and turned off simultaneously, has resulted in VSC (Voltage Source Converter) converters for forced commutation becoming an alternative. This type of transmission of electric power between a direct voltage network for High Voltage Direct Current being voltage stiff therethrough, and alternating voltage networks connected thereto, offers several important advantages with respect to the use of line-commutated CSCs in HVDC. In such systems, the consumption of active and reactive power may be controlled independently of each other, and there is no risk of commutation failures in the converter and thereby no risk of transmission of commutation failures between different HVDC links which may take place in line-commutation. Furthermore, it is possible to feed a weak alternating voltage network or a network without a generator of its own (a dead alternating voltage network).

In a plant of the type mentioned above, problems arise when the direct voltage on the direct voltage side of the station suddenly sinks or the alternating voltage on the alternating voltage side of the station suddenly increases, i.e., if the alternating voltage becomes too high with respect to the direct voltage for fulfilling the orders set. This may, for example, happen upon a suddenly increased tapping of active power of the alternating voltage network, and even if the plant in question has another station having an alternating voltage network connected thereto, and this station is adapted to try to keep the direct voltage of the direct voltage at a predetermined nominal value, the voltage regulation capability of this station will not be able to increase the corresponding power towards the direct voltage side, therefore, the direct voltage sinks. Thus, in such a case, the alternating voltage gets too high with respect to the direct voltage as a consequence of the sinking direct voltage. The problem so arising is associated with the means for calculating the pulse width modulation pattern, since so-called overmodulation occurs when a reference alternating voltage which is too high with respect to the direct voltage is reached. The consequence of this is that harmonics other than the characteristic ones are generated, and thereby disturbances are created in the networks and the equipment connected thereto.

SUMMARY OF THE INVENTION

The object of the present invention is to provide a plant of the type defined above, in which the problem of overmodulation and additional harmonics generated thereby is solved in an acceptable way.

This object is, according to the invention, obtained by providing a plant of the type defined in the introduction with members adapted to compare the amplitude of the reference alternating voltage with the direct voltage on the direct voltage side of the station between the two poles of the direct voltage network and when the quotient of the reference alternating voltage amplitude/half of the direct voltage exceeds a predetermined value send a signal to the control apparatus. The control apparatus is adapted to interpret the receipt of such a signal as an order to increase the consumption of reactive power of the alternating voltage side of the station and control the converter in accordance with this order.

Due to the fact that the control apparatus registers the receipt of an order of increased consumption of reactive power when the quotient exceeds the predetermined value, the reactive power consumption is increased, which means that the fundamental voltage produced by the converter will be lower, i.e., the amplitude of the reference alternating voltage is lowered, which requires a lower direct voltage. Thus, it is in this way possible to lower the value of the quotient, in which the predetermined value may be set so that overmodulation occurs upon exceeding that value, and in this way the overmodulation is eliminated and no harmonics other than the characteristic ones will be generated in the pulse width modulation.

According to another preferred embodiment of the invention, the members are adapted to send the signal to the control apparatus when the quotient exceeds a value equaling substantially 1. By choosing the predetermined value in this way, the signal resulting in an order of increased consumption of reactive power will occur at a relationship between the direct voltage and the alternating voltage which, in the most common type of pulse width modulation, means a lower limit for said overmodulation, so that overmodulation may efficiently be avoided while continuously achieving active and reactive current orders.

According to another preferred embodiment of the invention, the member is adapted to make the signal dependent upon the magnitude of the quotient, and the control apparatus is adapted to register an addition to the previous order of the consumption of reactive power, which is larger the larger the quotient is. It is thereby obtained that the amplitude of the reference voltage becomes lower the larger the quotient is, i.e., the larger the unbalance between the alternating voltage and the direct voltage, the amplitude lowering of the reference alternating voltage gets higher through the order of an addition to the reactive power to be consumed.

According to another preferred embodiment of the invention, the apparatus is adapted to, after receipt of the signal, during a certain period of time control the converter in accordance with an order of continuously increased consumption of reactive power and then after the period, according to an order of consumption of reactive power, on a substantially constant, higher level than before the receipt of the signal. By increasing the consumption of reactive power on the converter continuously as long as the quotient exceeds the critical value, the amplitude of the reference alternating voltage may be lowered until it reaches an acceptable level.

According to another preferred embodiment of the invention, the members are adapted to send a second signal to the control apparatus as soon as the quotient, after having exceed the predetermined value, sinks therebelow again, and the control apparatus is adapted to interpret the receipt of the second signal as an order of consumption of reactive power on a substantially constant, higher level, than before the receipt of the signal. This ensures that the plant will have the time to come into balance before the order of increased consumption of reactive power has been removed, for example, by another voltage-regulating station included in the plant managing to increase the direct voltage to a level which avoids the problem mentioned above.

According to another preferred embodiment of the invention, the plant comprises members adapted to register the peak value of the alternating current on the alternating voltage side of the station and to control the increase of the consumption of reactive power on the alternating voltage side of the station so that a determined permitted upper limit for the peak value is not exceeded. The presence of this member avoids the peak value of the alternating voltage current increasing to such a high level that an overcurrent protection is triggered and, for example, the converter or the station in question is temporarily switched off.

According to another preferred embodiment of the invention, the plant comprises means for calculating the pulse width modulation pattern. These means determine the width of the current pulses by determining intersection points of the reference alternating voltage and a triangle wave having an amplitude of half the direct voltage between the two poles of the direct voltage network at the station and a frequency being several times higher than that of the reference alternating voltage. This method of creating a pulse width modulation pattern is suitable in this type of plant and it is easy to avoid overmodulation in such a plant which occurs as soon as the amplitude of the triangle wave sinks below the amplitude of the reference alternating voltage by an appropriate choice of the predetermined value.

According to another preferred embodiment of the invention, the plant comprises members for measuring the direct voltage of the direct voltage network at the station. These members are adapted to send information to the comparing members, which, in combination with a further embodiment of the invention in which the plant comprises members adapted to measure the alternating voltage of the alternating voltage network at the station and on the basis thereof calculate the reference alternating voltage and send information about it to the comparing member, will compare the two voltage values measured to determine whether overmodulation is present or not, and whether an order of increased reactive power consumption should be given to the converter of the station.

According to another preferred embodiment of the invention, the plant comprises at least a second alternating voltage network connected through a second station, the second station is adapted to transmit electric power between the direct voltage network and the second alternating voltage network. The second station comprises at least one VSC converter adapted to convert direct voltage to alternating voltage and the converse, and an apparatus for controlling the converter. The apparatus of the second station is adapted to control the converter of that station to regulate the direct voltage of the direct voltage network at this station at a determined nominal value. Reliable operation of a plant of this type with a minimized risk of different disturbances is thereby obtained, which, through the existence of said voltage-regulating station, is considered voltage-stiff. However, the voltage regulation that may be carried out is normally insufficient for obtaining a corresponding power increase in the direct voltage network at the second station upon an increased power tapping at the first station, so that the direct voltage will then sink and thereby the quotient increases.

According to another preferred embodiment of the invention, the plant is designed for transmitting electric power through a direct voltage network for high voltage direct current (HVDC). The advantages of the plant according to the invention are apparent in this application.

Further advantages of the invention will appear from the following description.

BRIEF DESCRIPTION OF THE DRAWINGS

With reference to the appended drawings, below follows a description of a preferred embodiment of the invention cited as an example.

In the drawings.

DETAILED DESCRIPTION OF PREFERRED EMBODIMENTS OF THE INVENTION

Figure 1:
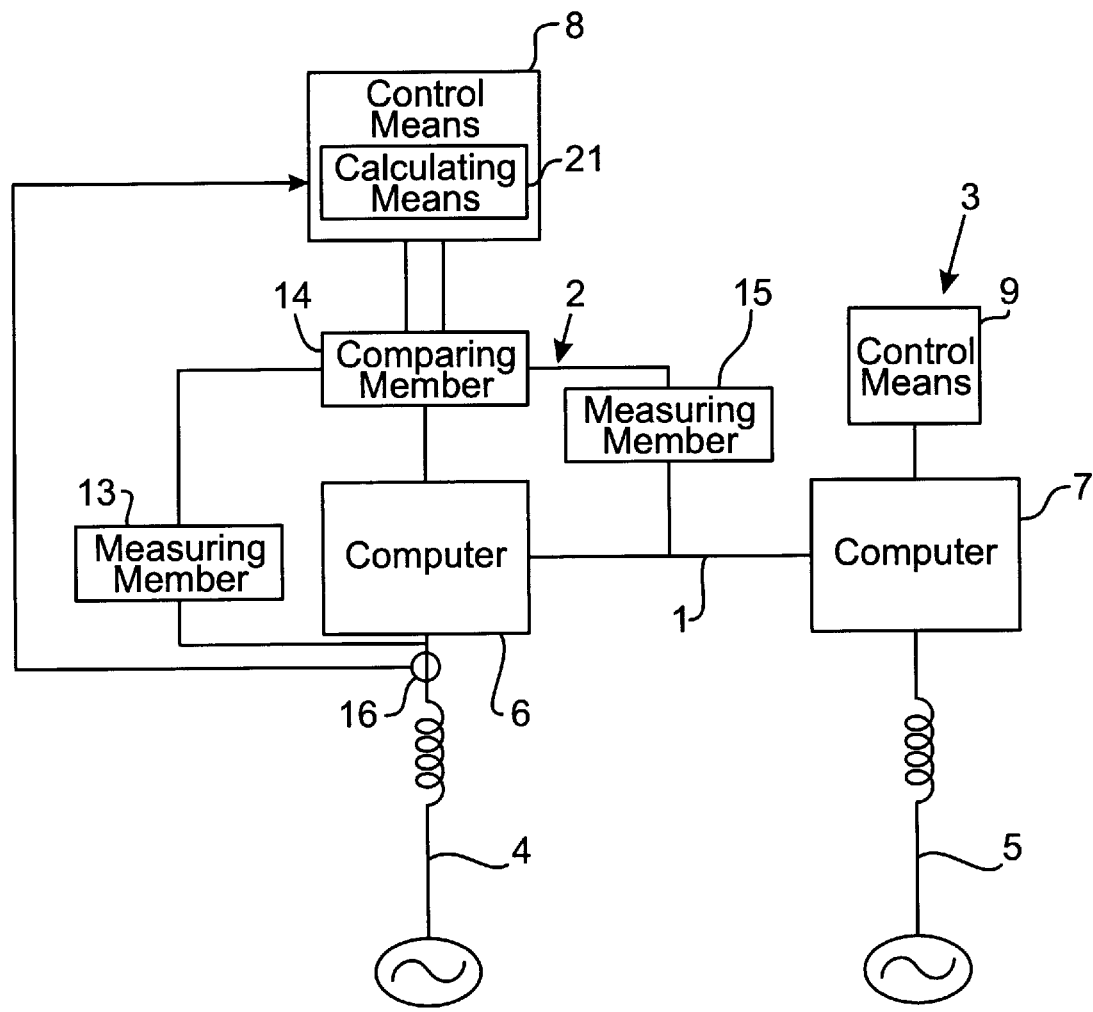
FIG. 1 is a schematic diagram illustrating the principles of the invention.

A structure of a plant for transmitting electric power according to the invention is illustrated in FIG. 1, in which only the different components directly affecting the function according to the invention have been shown in the drawings for facilitating the comprehension of the invention. The plant comprises a direct voltage network 1 for High Voltage Direct Current (HVDC), and in the present case, two alternating voltage networks 4, 5 each connected to the direct voltage network through a station 2, 3, which are indicated by an alternative voltage symbol and an inductance. The stations are adapted to perform transmission of electric power between the direct voltage network 1 and the respective alternating voltage network, in which the power may be fed in from an alternating voltage network to the direct voltage network, or fed out from the direct voltage network to an alternating voltage network. Thus, the alternating voltage networks may have generators of electric power or only be connected to consumers thereof.

The stations each comprise at least one VSC converter 6, 7 adapted to convert direct voltage into alternating voltage and conversely. However, it is possible that one station comprises a plurality of such converters, but these are, in the present case, summarized by one single box for each station. It is also possible that the alternating voltage networks have more than one phase, most often three phases, but the phases of the alternating voltage network are summarized in the figure by one single line. The respective VSC converter comprises, in a conventional way, valves, which consist of branches of breakers of turn-on and turn-off type connected in series, preferably in the form of IBGTs, and in a conventional way, diodes connected in anti-parallel therewith. A great number of IGBTs may, for example, be connected in series in one single valve so as to be turned on and turned off simultaneously so as to function as a single breaker, wherethrough the voltage across the valve may be distributed among the different breakers connected in series. The control of the breakers takes place, in a conventional way, through pulse width modulation (PWM), the principles of which will be explained further below with reference to FIGS. 1 and 3.

The stations further comprise an apparatus 8, 9, each schematically indicated, for controlling the respective converter 6, 7. Station 3 is adapted to be in voltage-regulating mode, in which the regulation takes place in a conventional way by the way in which the control pulses to the different valves of the converter are formed. The voltage-regulating station 3 attempts to maintain the voltage of the direct voltage network at a predetermined nominal value, in which this definition also includes the case of keeping the direct voltage value within a permitted predetermined interval.

Figure 2:
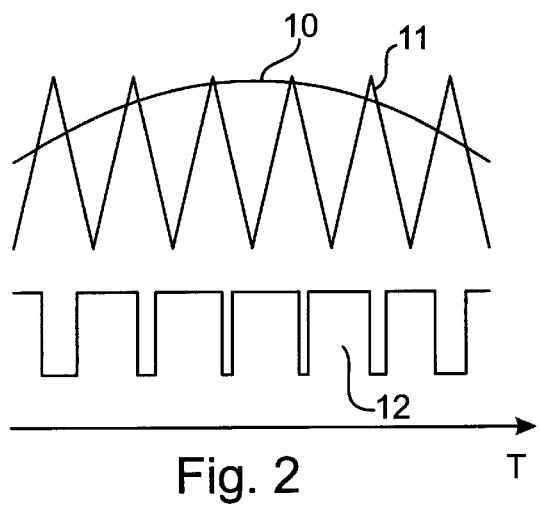
FIG. 2 is a graph illustrating the principles of pulse width modulation of a converter by comparing a triangle wave and a reference voltage.

The principle of pulse width modulation mentioned above will now be explained with reference to both FIGS. 1 and 2. The alternating voltage generated by the converter and calculated by the existing power consumption in the alternating voltage network is called the reference alternating voltage 10 and has a sine-wave form. For determining the width and direction of the pulses to be generated by the converter, a triangle wave 11 having a frequency several times higher than the frequency of the reference alternating voltage is utilized, and the amplitude of this wave is one half the voltage between the poles of the direct voltage network 1 at the station 2. By superimposing the "curves" 10 and 11 and determining the points of intersection of the reference alternating voltage curve 10 and the triangle wave 11, the direction and the width of the direct voltage pulses generated by the converter 6 are determined. The respective pulse is directed in the direction opposite of the point of the triangle wave in question between two adjacent intersection points. The pulses are sent out with a frequency corresponding to the frequency of the triangle wave. The pulses 12 have an amplitude of half the direct voltage, i.e., the same amplitude as the triangle wave, and the pulses 12 are accordingly shown in a reduced scale with respect to the triangle wave in FIG. 2.

Figure 3:
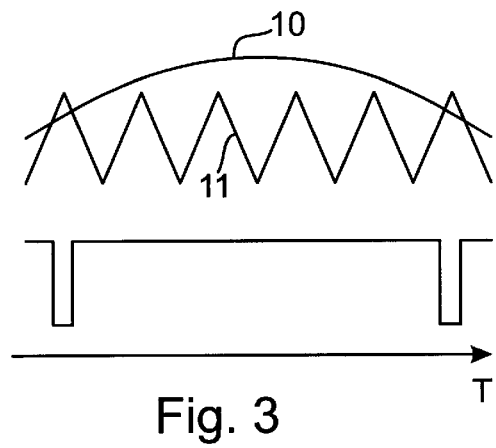
FIG. 3 is a view substantially corresponding to FIG. 2 and illustrating the occurrence of overmodulation in the pulse width modulation.

A means 21 calculates the pulse width modulation pattern. The voltage of the direct voltage network is preferably kept at a level such that the reference alternating voltage will intersect all the waves of the triangle wave with a certain margin, preferably about 10%, i.e., the amplitude of the triangle wave will be about 10% higher than the amplitude of the reference alternating voltage. Differences greater than this are not desired, since it costs more to maintain a high voltage in the direct voltage network. This means, in turn, that when an unbalance between the direct voltage side and the alternating voltage side occurs, the amplitude of the reference alternating voltage may get higher than the amplitude of the triangle wave. By that, some of the waves of the triangle wave will not be intersected by the reference alternating voltage curve, so that a so-called "overmodulation" occurs, which makes is impossible to achieve the order set and harmonics other than the characteristic ones are generated in the different networks and in equipment connected thereto. Alternating voltage filters are dimensioned for these characteristic harmonics. The object of the invention is to minimize the risk of occurrence of such overmodulation, which is illustrated in FIG. 3.

The second station 2 has members 13 adapted to measure the alternating voltage of the alternating voltage side of the station and send the measured alternating voltage value to a comparing member 14 as information about the reference alternating voltage. The plant also comprises members 15 adapted to measure the direct voltage of the direct voltage network 1 at the station 2 and send information thereabout to the comparing member 14. The comparing member 14 is adapted to compare the amplitude of the reference alternating voltage and the direct voltage on the direct voltage side of the station between the two poles of the direct voltage network, and when the quotient of reference alternating voltage amplitude/half the direct voltage exceeds a predetermined value, send a signal to the control apparatus 8. This control apparatus is, in turn, adapted to interpret receipt of such signal as an order of increased consumption of reactive power of the alternating voltage side of the station and to control the converter 6 according to this order. The predetermined value of the quotient is preferably set to be substantially identical to 1, so that the signal is sent when overmodulation is imminent. It may, of course, be advantageous to set this value just below 1, for example to 0.98, to minimize the duration of possible overmodulation.

The function of the plant according to the invention is described below. When an alternating voltage of the alternating voltage network is abnormally high with respect to the direct voltage of the direct voltage network, which may take place either through an increasing alternating voltage or through a sinking direct voltage, the comparing member 14 will send a signal to the control apparatus, which is to be interpreted as an order of an increased consumption of reactive power of the alternating voltage side of the station. The control apparatus 8 will form the control pulses to the converter of the station for obtaining an increased consumption of reactive power, and thereby the amplitude of the reference alternating voltage will sink, so that the overmodulation disappears. Thus, the increased consumption of reactive power means that the fundamental voltage produced by the converter becomes lower, which requires lower direct voltage, so that the direct voltage available is sufficient. The plant also has members 16 for monitoring the peak value of the alternating currents, which are adapted to control the increase of the consumption of reactive power on the alternating voltage side of the station so that a predetermined upper limit permitted for said peak value is not exceeded. Thereby, there is avoided that any overcurrent protection is activated which temporarily blocks the converter in question or the entire station.

Figure 4:
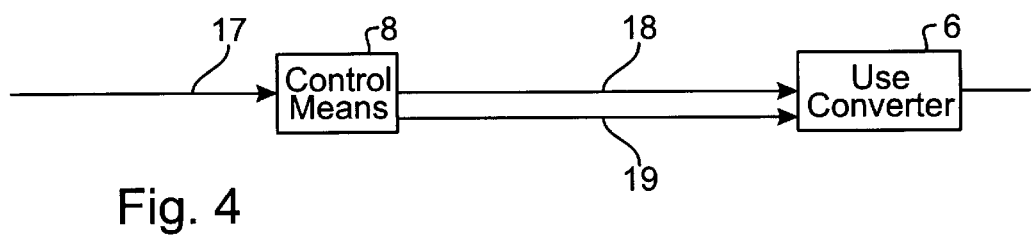
FIG. 4 is a simple view, by means of which the principle of the invention may be explained.

It is schematically illustrated in FIG. 4 how a signal of overmodulation 17 arrives at the control apparatus 8 for controlling the consumption of reactive power, and how an additional signal 19 for an addition to the consumption of reactive power is sent to the converter 6.

Figure 5:
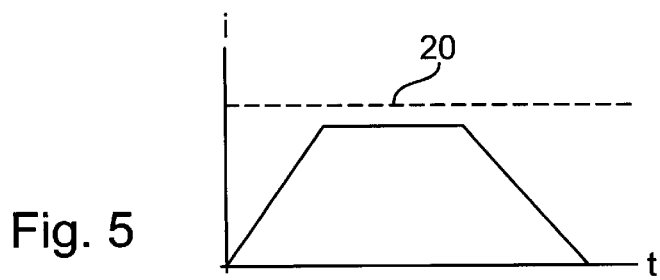
FIG. 5 is a graph illustrating the process of the additional consumption of reactive power of the plant according to FIG. 1 versus the time when an overmodulation state occurs.

FIG. 5 illustrates how the addition to the consumption of reactive power is developed over time when an overmodulation occurs at the point of time zero. Accordingly, there is first a ramping of the addition, which is shown through an increased alternating current 1, during a certain period of time which this ramping is intended to take place until the signal of overmodulation is no longer sent out from the comparing member 14, i.e., overmodulation is no longer at hand. When the indication of overmodulation becomes inactive, this order of increased consumption of reactive power is maintained during a predetermined period of time, whereupon it is ramped down to zero again. The length of this procedure, from the beginning of the ramping up to the termination of the ramping down, is preferably in the order of 10 ms. The limit for the peak value of the alternating current is indicated by the dashed line 20, and the order of increased consumption power is made accordingly so that this peak value is not exceeded.

The method and the calculation of the pulse width modulation pattern described above are in practice carried out separately for each phase of the alternating voltage network.

The invention is, of course, not in any way restricted to the embodiment described above, but several possible modifications thereof will be apparent to one skilled in the art without departing from the basic idea of the invention.

A plant may, as already mentioned, have components not shown in the drawings, such as, for example, harmonic filters for eliminating harmonic currents created in the pulse width modulation.

Although symbols have been shown in FIG. 1 for some members, means, or the like, it is not at all necessary that these exist as separate components, but the functions they have to fulfill may be ensured by any component also having other tasks and, for example, values may not be measured directly, but calculated from values measured of any other quantity.

Furthermore, it is not at all necessary that the plant has a second station, as described above, but it may very well be that it only has the first station, but it may also have more than two stations. It is then, in the case of two or more stations, also possible that more than one of the stations, preferably all of them, have the features according to the invention being capable to solve the problem of overmodulation at exactly that station.

What is claimed is:

1. A method for eliminating overmodulation in a power plant having a direct voltage network connected to at least one alternating voltage network through a station, said station being adapted to transmit power between said direct voltage network and said alternating voltage network and including at least one converter, said VSC converter being adapted to convert direct voltage into alternating voltage and the converse, said method comprising the steps of:

calculating a reference alternating voltage;

measuring a direct voltage between two poles of a direct voltage side of a station;

dividing said reference voltage by half of said direct voltage;

comparing the quotient of the division with a predetermined value;

sending a first signal to a means for controlling said converter when said quotient exceeds said predetermined value;

increasing consumption of reactive power on the alternating voltage side of said station in response to said first signal by control of said converter.

2. The method of claim 1 wherein said predetermined value equals substantially one.

3. The method of claim 1 further comprising the steps of, making said first signal dependent on the magnitude of said quotient; and sending an additional order to make the reactive power consumption larger the larger the quotient is.

4. The method of claim 1 further comprising the step of, increasing the consumption of reactive power for a predetermined period of time; and maintaining the consumption of reactive power after said period at a substantially constant level which is higher than the level before receipt of said first signal.

5. The method of claim 1 further comprising the step of sending a second signal, after sending said first signal, for consumption of reactive power at a higher, substantially constant level when said quotient sinks below said predetermined value.

6. The method of claim 5 further comprising the step of sending a third signal, after said second signal, for a certain period of time for continuously reducing reactive power consumption until said reactive power consumption corresponds to the reactive power consumption before said first signal was sent.

7. The method of claim 1 further comprising the step of limiting the increase of the consumption of reactive power so that an upper limit of a peak voltage of the alternating current of the alternating voltage side of the converter is not exceeded.

8. The method of claim 1 further comprising the step of determining the width of the pulse width modulation pattern by the intersection points of said reference voltage with a triangular wave, said triangular wave having an amplitude one half the direct voltage and having a frequency higher than the frequency of the reference voltage.

9. A plant for transmitting electric power comprising, a direct voltage network connected through a station to at least one alternating voltage network, said station being adapted to transmit power between said direct voltage network and said alternating network, said station including at least one VSC converter, said converter being adapted to convert direct voltage into alternating voltage and the converse;

means for calculating a pulse width modulation pattern;

means for controlling said converter based on a reference alternating voltage which communicates with said means for calculating;

means for comparing the quotient of (a) the reference alternating voltage and (b) half the amplitude of the direct voltage measured between the two poles of said direct voltage network to a predetermined value and for sending a signal to said means for controlling when said quotient exceeds said predetermined value, whereby said means for controlling controls said converter to increase the reactive power consumption on the alternating voltage side of said station.

10. The plant of claim 9 wherein said predetermined value is substantially equal to one.

11. The plant of claim 9 further comprising means for measuring the direct voltage of the direct voltage network at said station communicating with said means for controlling.

12. The plant of claim 11 wherein said means for measuring communicates with said means for calculating.

13. The plant of claim 9 further comprising means for measuring said alternating voltage on said alternating voltage side of said station and for calculating the reference alternating voltage based thereon.

14. The plant of claim 11 wherein said apparatus for controlling is adapted to control said converter with an order in the form of a transient influence in the order of milliseconds.

15. The plant of claim 9 further comprising at least a second alternating voltage network connected through a second station, said second station being adapted to transmit electric power between said direct voltage network and said second alternating voltage network, said second station comprising at least one VSC converter adapted to convert direct voltage to alternating voltage and the converse, and means for controlling the converter of said second station to regulate said direct voltage of said direct voltage network at said second station at a predetermined nominal value.

16. The plant of claim 9 wherein electric power is transmitted through said direct voltage network for High Voltage Direct Current.

* * * * *